Feb. 18, 1930. M. J. CALLAHAN 1,747,158
INLET AND RECIRCULATING DAMPER FOR HEATING AND VENTILATING UNITS
Filed July 29, 1925 5 Sheets-Sheet 2
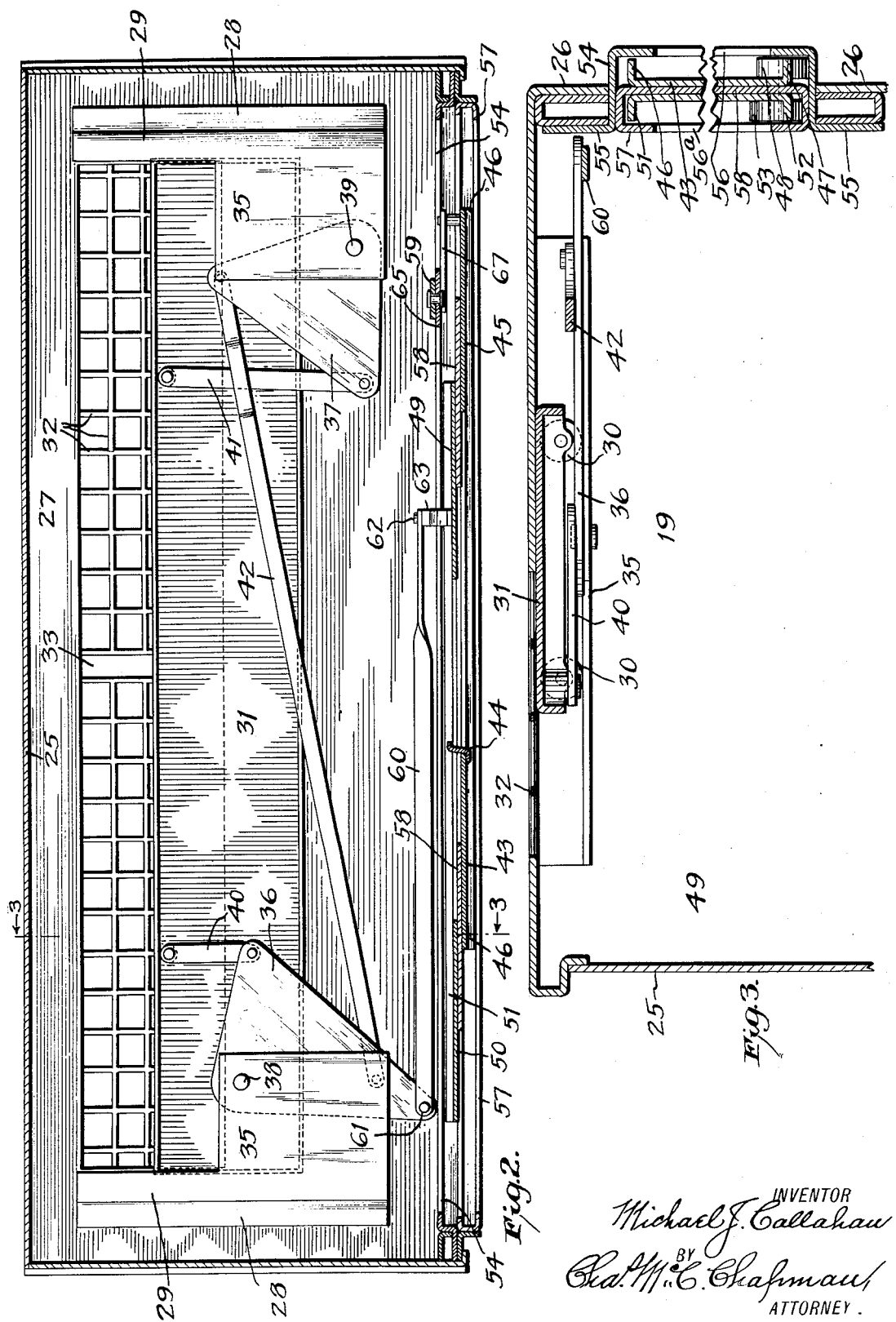
INVENTOR
Michael J. Callahan
BY
Geo. M. C. Chapman
ATTORNEY.

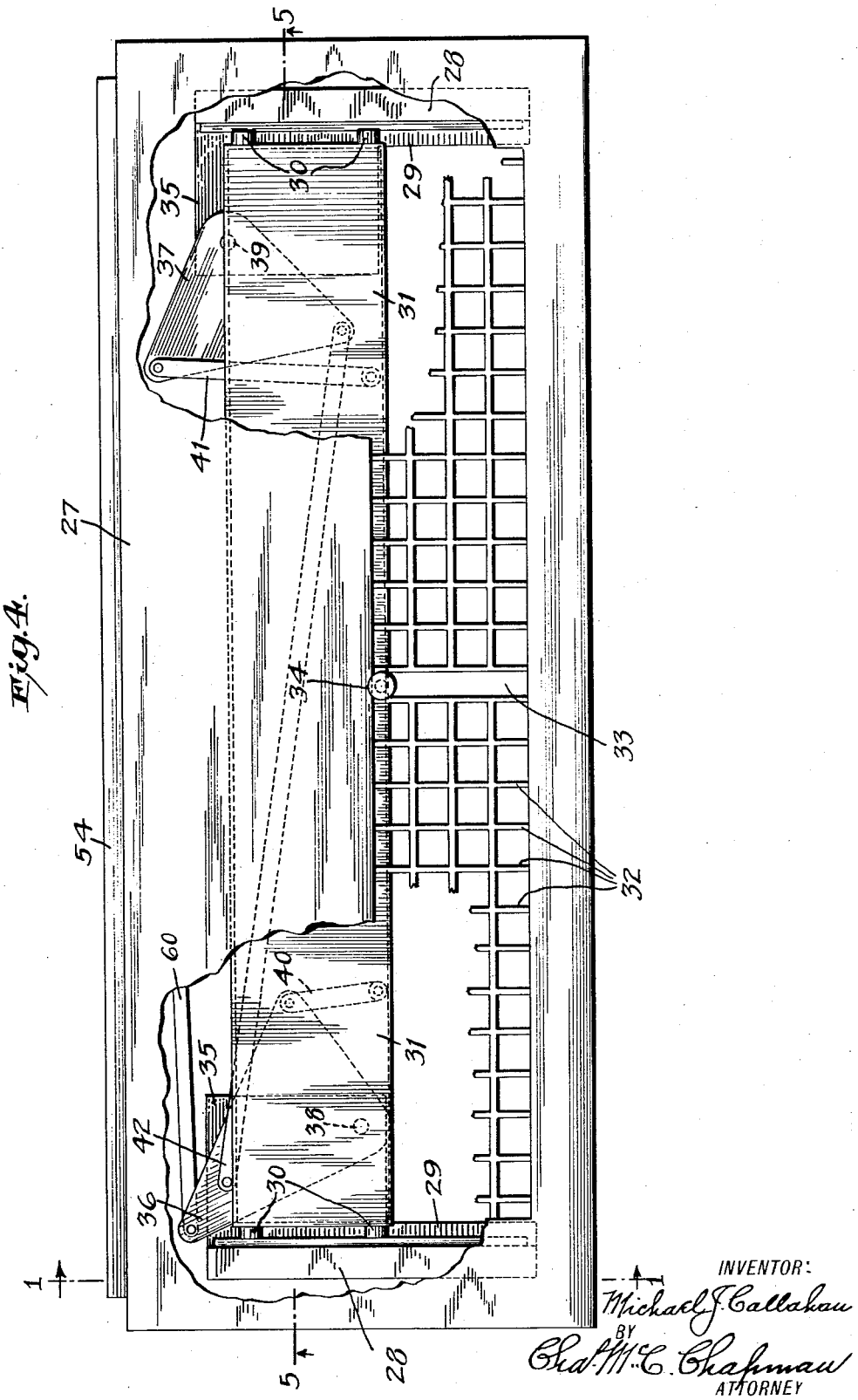

Feb. 18, 1930. M. J. CALLAHAN 1,747,158
INLET AND RECIRCULATING DAMPER FOR HEATING AND VENTILATING UNITS
Filed July 29, 1925 5 Sheets-Sheet 4
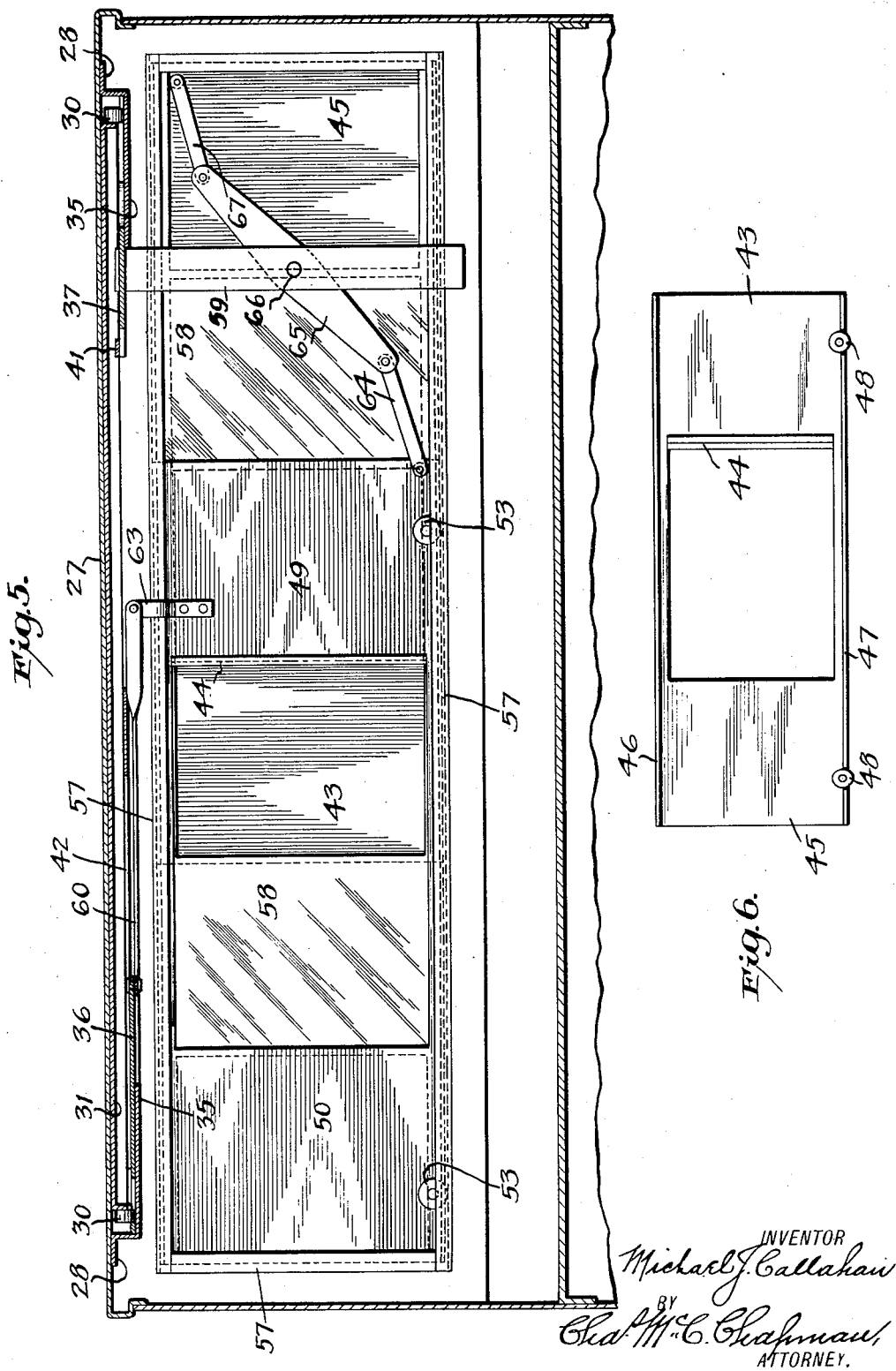

Feb. 18, 1930.     M. J. CALLAHAN     1,747,158
INLET AND RECIRCULATING DAMPER FOR HEATING AND VENTILATING UNITS
Filed July 29, 1925     5 Sheets-Sheet 5
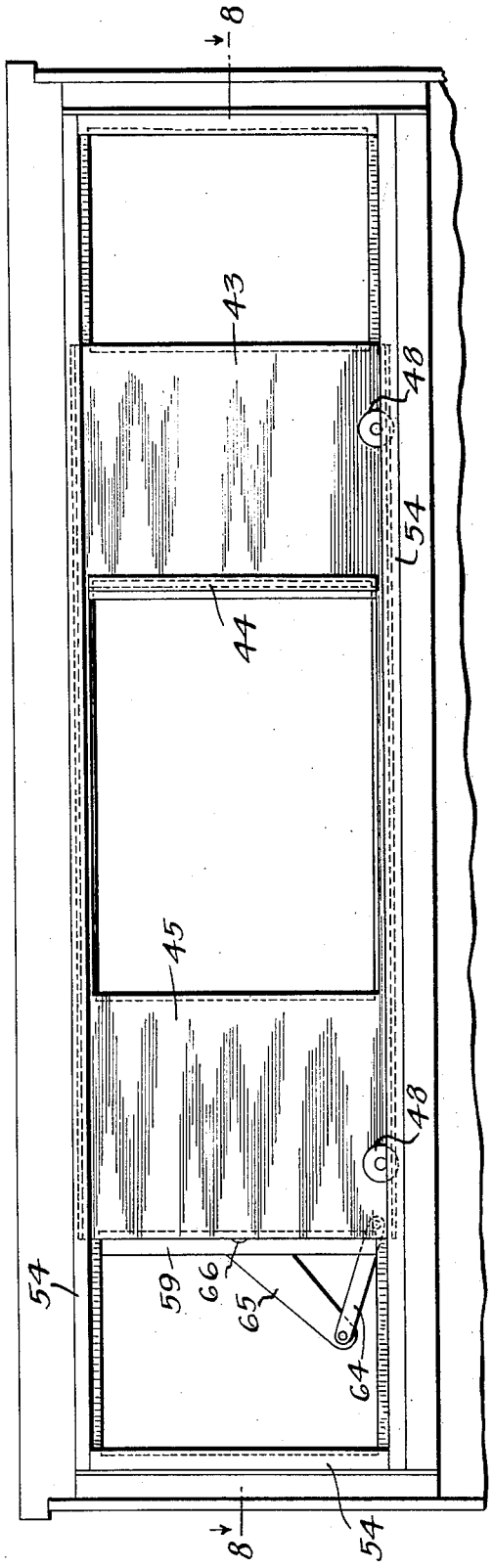
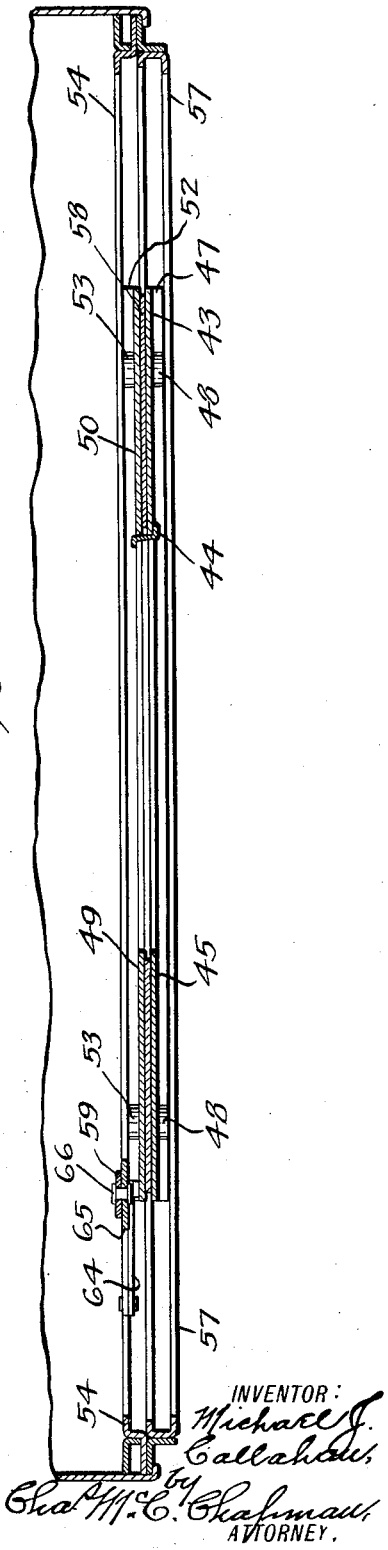

Patented Feb. 18, 1930

1,747,158

UNITED STATES PATENT OFFICE

MICHAEL J. CALLAHAN, OF NEW YORK, N. Y.

INLET AND RECIRCULATING DAMPER FOR HEATING AND VENTILATING UNITS

Application filed July 29, 1925. Serial No. 46,928.

This invention has reference to ventilating apparatus of the "unit" type, viz, apparatus which are adapted to heat and ventilate the room or space in which the unit is installed; that is to say, control the temperature and ventilate the atmosphere in the room of installation. My invention particularly relates to means whereby recirculation of the air in the room of installation is brought about, and to the control of the inlet and recirculation dampers of the unit. My apparatus is adapted for installation in buildings where it is desirable to economize space, reduce cost of installation and control the condition of the air and the temperature in individual rooms, such as schools, lecture halls, ball-rooms and other public assembly rooms in hotels or other buildings.

Among the objects of my invention may be noted the following: To provide a heating and ventilating machine, apparatus or unit with a novel construction of inlet dampers and a novel construction of recirculating dampers which interact to control the admission of air to the unit and the recirculation of the air of the room of installation through the unit; to provide a heating and ventilating unit with inlet and recirculating dampers, together with means interacting therewith for controlling the action of the two sets of dampers; to provide a heating and ventilating unit the construction of which enables it to be placed flat against the wall of the room of installation adjacent a window or other inlet opening, without the necessity of providing extension or filling-in strips, usually found necessary when apparatus of the usual type are installed, thus facilitating installation of the unit, rendering the installation economical, and providing for sightly appearance of the unit, regardless of the location of the same relative to a window or other inlet opening; and to provide certain details of construction which are simple, compact, economical and efficient for the purpose of simultaneously shifting, proportionally, the recirculating and inlet dampers.

With the foregoing objects in view and others which will be detailed during the course of this description, my invention consists in the parts, features, elements and combinations thereof hereinafter described and claimed.

In order that my invention may be clearly understood, I have provided drawings wherein:

Figure 2 is a horizontal sectional view taken substantially on the line 2—2 of Figure 1, the direction of sight being toward the top of the apparatus thus giving a bottom view of the recirculating damper and the mechanism actuated thereby;

Figure 3 is a sectional view on the line 3—3 of Figure 2;

Figure 4 is a top plan view of the unit of Figure 1, parts being broken away to show the recirculating damper and the mechanism actuated thereby;

Figure 5 is a vertical section giving a view of the top of the unit, the section being taken on the line 5—5 of Figure 4, and the view being toward the rear of the unit whereby the inlet dampers are shown in side elevation;

Figure 6 is a view on a small scale showing the outside inlet damper, duplex in form, the view being in side elevation;

Figure 7 is a view similar to Figure 5, but looking at the inlet dampers from the outside, and the dampers being shown shifted to the full open position, while in Figure 5 the dampers are shown in full closed position; and Figure 8 is a view in horizontal section on the line 8—8 of Figure 7.

Figure 1:
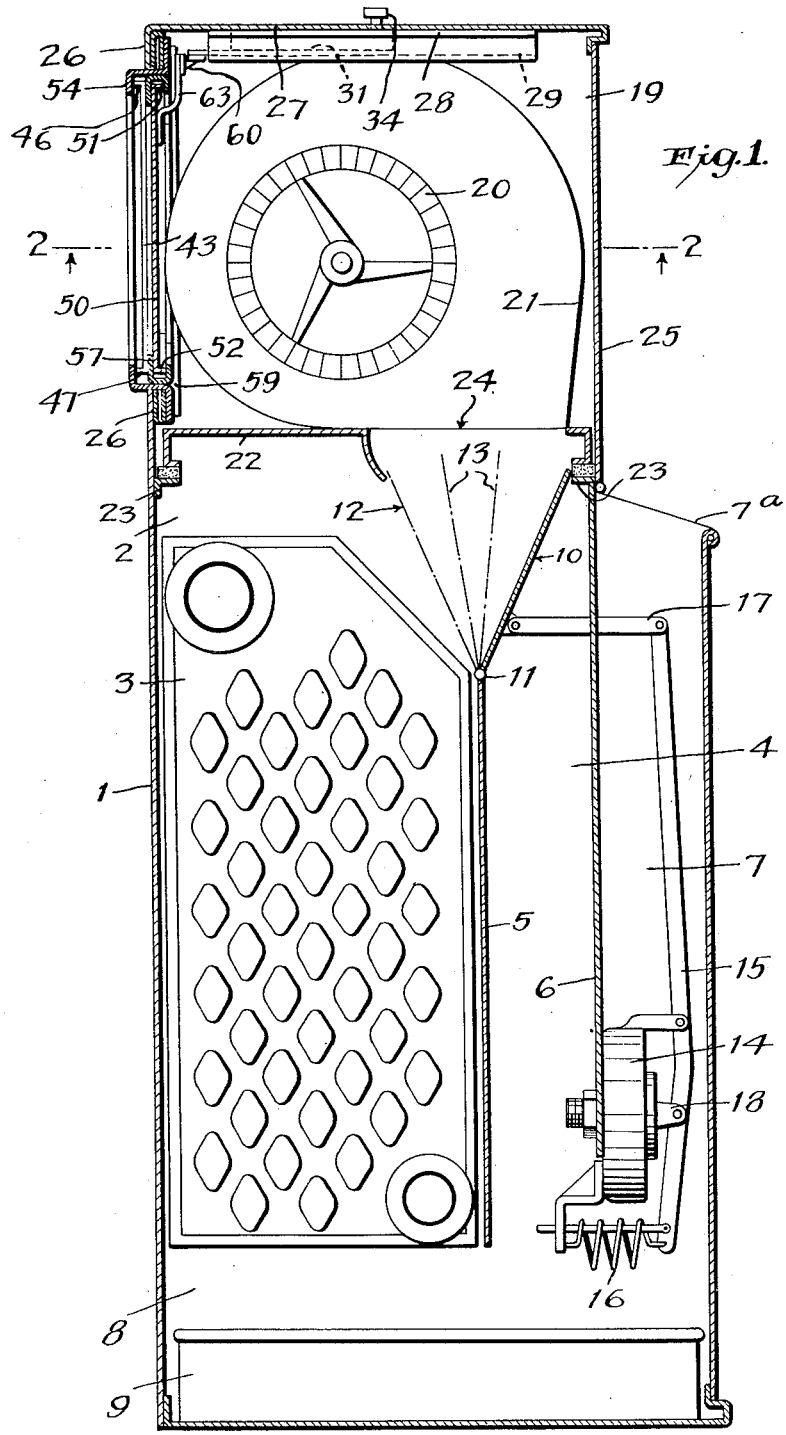
Figure 1 is a view in sectional elevation of a complete heating and ventilating unit embodying my invention, the section being taken vertically through the apparatus approximately on the line 1—1 of Figure 4.

Referring to the drawings, Figure 1, the numeral 1 indicates the lower portion of the unit, shown as divided into a heating chamber 2 in which is located a heating element 3, a by-pass chamber 4 produced by a partition 5 forming the front of the heating chamber, a baffle 6 forming the front of the by-pass chamber and the back of the discharge chamber 7, the front of the latter chamber being the front wall of the casing; and also a humidifying chamber 8 in which is located the water pan 9 providing the humidifying means. At the top of the by-pass and heating chambers, and at the entrance thereto, a damper 10 is provided, the same being pivoted at 11 to the top of the partition 5, so as to be able to swing from the extreme right-hand position shown in full lines, to the extreme left-hand position indicated by the dotted line 12, and to assume any one of many intermediate positions between the two extremes, some of which are indicated by the dotted lines 13. Mounted on the baffle 6 is a so-called sylphon motor 14, on which is pivotally mounted a lever 15 controlled in a measure by spring 16 connected thereto at one end and at the other to a bracket carried by the motor, said lever having its opposite end pivotally connected to one end of a link 17, the opposite end of which is pivotally connected to the damper 10 which is known in the art as a "mixing damper". The lever 15 is pivotally connected to the plunger 18 of the sylphon motor, which latter is in turn under control of a thermostat (not shown) in the room of installation of the unit, the motor thus being automatically operated, although said motor may be also hand-controlled in a manner now well known in the art. The casing 1 is also provided at its upper end with a motor and blower chamber 19, in which one or more fans 20 may be located to be driven by an electric motor (not shown), the fans being surrounded by the shields 21, open at opposite sides, and the fans, motor and shields all being mounted on and supported by the motor-board 22 which separates the heating and by-pass chambers from the motor and blower chamber. The motor-board 22 is supported by brackets or angle pieces 23 at the front and back of the casing on which sound insulating material may be imposed. The motor-board 22 has, according to the number of fans employed, passages at 24 to admit air from the shields 21 into the heating and by-pass chambers. All the foregoing structure is substantially in accord with that disclosed in my Patent #1,503,089, granted July 29, 1924.

According to the principles of my present invention, the inlet dampers, at the back of the chamber 19, and also the recirculating dampers, at the top of said chamber, are constructed to have right-line reciprocations instead of pivotal action, and said dampers are caused to move simultaneously, the inlet dampers being moved correspondingly and proportionally to the movements of the recirculating dampers. By thus constructing the dampers and providing proper interacting parts, I am enabled to do away with many parts of the apparatus, reduce the size of the latter, change its form and enable it to be placed snugly and flat against the vertical wall below and around the window or other inlet opening of the building or room of installation of the unit. That is to say, my invention can be applied to many different forms of heating and ventilating units and is not modified, in either structure, action or function, by the character of apparatus below the chamber 19; and the usual inlet chamber of such units, at the back of the chamber 19, is greatly reduced in size, rendered quiet in action and the dampers are so changed in form as to enable them to be shifted in rightlines, the inlet dampers at an angle to the recirculating damper.

Still referring to Figure 1, the front wall of the chamber 19 is indicated at 25, the rear wall at 26, and the top wall at 27, and, also viewing Figure 4, it will be seen that to the top wall, on its under side and at its opposite ends angular strips 28 are suitably secured which provides ledges or tracks 29 for anti-frictional rolls 30 carried by the recirculating damper 31, which may be shifted from front to rear of the unit and horizontally across the damper opening in the top of the chamber 19, which is covered by a grille or suitable screen 32, the center of which has a longitudinal slot 33 in which travels a headed stud 34, carried by the top of the damper 31, so that the latter may be shifted by hand rearwardly and forwardly according to the extent of the opening desired in the top 27 of the chamber 19.

Viewing also Figures 2 and 3, it will be seen that the angular supporting strips 28 are provided with enlarged lateral horizontal extensions 35 upon which are pivotally mounted bell-crank levers 36 and 37, the lever 36 being pivoted at 38 to the front corner of the extension 35 and the lever 37 being pivoted at 39 to the rear corner of the extension 35. Thus the two bell-cranks act in reverse manner. The bell-crank 36 is pivotally connected to the link 40 which in turn is pivotally connected to the bottom of the damper 31, and the bell-crank 37 is pivotally connected to the link 41, which in turn is pivotally connected to the bottom of the damper. Due to the mode of mounting the two levers 36 and 37, and connecting the same to the damper 31, for the functional purposes, the link 41 is much longer than the link 40. The two bell-crank levers are pivotally connected together by the link 42, which is pivoted to the front end of the bell-crank 37 and near the rear end of the bell-crank 36. Thus the movement of the sliding damper 31 is transmitted through the links 40 and 41 to the bell-crank levers 36 and 37, respectively, and the latter move in unison, through the medium of the link 42, so that the inlet dampers, presently described, will be shifted proportionally a greater distance than the shifting movement of the damper 31.

Now, viewing also Figures 5 to 8, inclusive, it will be seen that the inlet dampers are two in number and duplex in character; that is to say, the outside duplex damper, shown in Figure 6 separated from the unit, is composed of a plate one closure end of which is indicated at 43 having along its inner edge at the damper-opening, an angular "filling" strip 44, and the other closure end of which is indicated at 45. This outer damper is also provided with a top flange 46 and a bottom flange 47, through which latter anti-frictional rolls 48 extend which are journaled in the damper and are adapted to run in a track presently described. The inside damper, likewise duplex in character, is provided with the closure end 49 spaced by an aperture or opening from the closure end 50. This damper is also provided at its upper edge with a flange 51, see Figure 3, and at its lower edge with a flange 52 through which extend the anti-frictional rolls 53, running in a track presently described, the rolls being journaled in the lower side of the damper. Viewing Figure 3, it will be seen that the rear wall 26 of the chamber 19 is provided with an outside, angularly bent strip of metal 54, forming the outer wall of the fresh-air inlet chamber, the inner outturned flanges 55 of which are suitably secured to said wall 26, the strip 54 having openings 56 for the inlet of air from the outside of the unit to the inlet and motor and blower chambers 19. Inside the strip 54 is set a hollow member 57, also provided with openings 56ᵃ corresponding to the openings 56. The member 57 is provided with solid webs or plates 58, Figure 5, which cooperate with the dampers to entirely close the back of the inlet chamber of the unit when the dampers are properly shifted relatively. The closed position of the dampers is shown in Figure 5, while the open position of the dampers is shown in Figures 7 and 8. Figure 2 shows an intermediate position of the dampers, and it will be understood that the outer damper slides between the plate 54 and the inner wall of the member 57, while the inner damper slides within the member 57. It will be readily understood that, while I have shown the outer plate 54 as an angular plate, and the tubular member 57 on the inside of the unit, the position of these members may be reversed, as shown in Figures 2 and 8, so that the outer damper will slide in the tubular member while the inner damper will slide between the latter and the plate 54. Other forms of construction and track making means for the dampers may be provided within the scope of my invention. The inner member, regardless of form, is provided with a cross-bar 59, Figures 2, 5, 7 and 8, for the purpose presently described. A link 60 is pivotally connected at 61 to the extreme outer end of the bell-crank lever 36, and at its opposite end is pivotally connected at 62 to a bracket 63 secured to the inner side of the closure end 49 of the inside damper. Thus the inner damper is shifted in its guideway as the bell-crank levers are shifted. A link 64 is pivotally connected at one end to the lower edge of the closure end 49 of the inside damper, the opposite end of said link being pivotally connected to a lever 65 pivoted at its middle 66 to the bar 59, the opposite end of the lever being pivotally connected to one end of a link 67, the opposite end of which is pivotally connected to the top of the closure end 45 of the outside damper. Thus as the inside damper is shifted, by the link 60, the outside damper is shifted by the lever 65 and link connections in the opposite direction.

From the foregoing description, it will be seen that the entire apparatus, barring the levers and links and a few of the elemental details, is or can be made of sheet metal cut and stamped into shape, and that, in consequence, the unit can be economically, strongly and efficiently made; and that the unit is exceedingly compact in the matter of the inlet and recirculating dampers and the arrangement thereof, and that the inlet chamber and damper structure project only a short distance from the rear of the unit or back wall thereof. This enables the unit to be placed with its back wall flat against the room or building wall below and on the sides of the inlet opening, and the slight projection of the inlet chamber beyond the wall of the unit is ample to snugly fit the wall opening and at the same time not interfere with the implacement of the unit. This structure does away with the long rear extension and inlet chamber of the units heretofore constructed by me; does away with pivotally mounted dampers which always rattled and vibrated inordinately, to the annoyance of the inmates of the room when the fans were in operation; enables the use of a strong, compact actuating connection between the inlet dampers and the recirculating damper; avoids the necessity for lifting lids or dampers in the top of the unit; and eliminates the use of trim pieces, spacing plates and moldings between the back of the unit and the wall of the room or building, thus enabling the unit to be installed without projecting so far as ordinarily into the room, bringing about an increase of floor space the utilization of which is important, especially in schoolrooms, lecture halls and similar assembly places.

The operation of the apparatus will be readily understood from the following brief description: With the damper 10 in full line position, Figure 1, the inlet dampers open, the recirculating dampers closed, and the fans set in operation, air drawn in by the fans from the outside of the room of installation will be driven by the fans through the heating chamber 2 where its temperature will be raised, and, upon reaching the humidifying pan, dust and other foreign ingredients of the air will be eliminated by contact of the air with the water, and then the air will be delivered through the outlet chamber 7 at the discharge opening 7ᵃ into the room of installation. When the room becomes too warm, the thermostat will automatically operate to set the sylphon 14 into operation, resulting in shifting the mixing damper 10 to the left into any one of a number of dotted line positions 13, thus bringing about the by-pass of a predetermined amount or volume of cold fresh air; that is to say, part of the fresh air going through the heating chamber 2 and a part of it through the by-pass chamber 4 to be mixed in the humidifying chamber 8 and discharged at the predetermined temperature through the chamber 7. If the temperature of the room of installation is too high, the damper 10 will be automatically gradually shifted, as previously described, into the extreme dotted line position 12, causing all the fresh air to by-pass the heating chamber and be discharged into the room of installation at approximately its outside temperature.

It frequently becomes desirable to recirculate the air in the room of installation, as when the outside temperature is extremely low, or the heating element is running at low temperature, or when it is desired to have the temperature in the room of installation above the usual predetermined degree. In such case, the recirculating damper 31 will be shifted by the handle 34 from the front to the rear of the unit, thus causing the operation of the bell-crank levers 36 and 37, which in turn, through the connecting links 42 and 60, will operate the inside damper, the latter in turn operating the outside damper through the connection of the lever 65. The movement of the inlet dampers, both inside and outside will be proportional to the movement of the damper 31, and upon observation of Figures 2 and 4 it will be understood that the movement of the inlet dampers will be greater, from one extreme to the other, and more rapid than the movement of the damper 31 from one extreme to the other. Furthermore, it will be seen, upon viewing Figures 2, 5, 7 and 8, that, when the duplex damper 49—50 is shifted by the link 60, the duplex damper 43—45 will be shifted to the same extent, but in an opposite direction by the connection of lever 65 and links 64—67 to the said two dampers. Figure 5 shows the closed position of the two inlet dampers which, in cooperation with the fixed back plate members 58, close the entire back of the inlet chamber; while Figure 7 shows the open position of the inlet dampers, disclosing the three openings in the back of the chamber 49 produced by the fixed back plate members 58. Viewing Figures 2, 6 and 8, it will be seen that the outside damper carries an angular cross-strip 44 which is adapted to close the space between the inside and outside dampers when said two dampers are fully closed or in the position of Figure 5. This cross-strip 44 prevents leakage of air or air being sucked in by the fans when the inlet dampers are closed, since, viewing Figures 2 and 8, when the left-hand, inside, damper closure 49 is in the middle position and the outside, right-hand, damper closure 43 is also in the middle, there is a space between the inner adjacent faces of the two damper members. The space is created by the thickness of the walls 58 of the member 57 which intervenes between the tracks of the inside and outside dampers. The space thus left between the two dampers is completely spanned and closed by the cross filling strip 44, thus preventing suction or leakage of cold air into the unit, or chamber 49 thereof, when the dampers are closed and such leakage, or admission of air, would be objectionable, from the operational standpoint of recirculation of air through the unit. This is an important feature and upon it, and the combination of parts coactive therewith, I desire to lay stress.

Having thus described my invention, what I claim and desire to secure by Letters Patent is:

1. A heating and ventilating unit comprising, in combination, a blower chamber and an inlet chamber communicating with each other, inlet dampers arranged in the inlet chamber, an opening in the blower chamber and a damper controlling the same, and means connecting the inlet dampers with the other damper whereby the several dampers may have imparted thereto right-line reciprocations.

2. A heating and ventilating unit comprising, in combination, a blower chamber and an inlet chamber, dampers for controlling the admission of air to the inlet chamber arranged in parallelism and adapted to slide relatively to each other, an opening in the blower chamber, a damper for controlling the opening, and means for connecting the several dampers whereby, when one is operated, the others will be operated for controlling the passage of air.

3. Recirculating means for a heating and ventilating unit comprising a chamber adapted to contain a motor and blowers, and having an opening in its top and an inlet chamber at its back, a horizontally arranged sliding damper for controlling the opening in the top of the chamber, a vertically arranged sliding damper for controlling the opening in the inlet chamber, and means between the two dampers whereby to actuate one from the other.

4. Recirculating means for a heating and ventilating unit comprising a chamber adapted to contain a motor and blowers, said chamber having an opening in its top and an inlet chamber at its back, a horizontally arranged sliding damper adapted to control the opening in the top of the chamber, a plurality of dampers vertically arranged sliding in the inlet chamber adapted to control the opening thereof, and means connecting the first-named damper with the other dampers whereby, when the first-named damper is actuated, the other dampers will be coordinately actuated.

5. Recirculating means for a heating and ventilating unit comprising a chamber adapted to contain a motor and blowers and having an opening in its top and an inlet chamber at its back, a horizontally arranged damper for controlling the opening in the top of the chamber, vertically arranged dampers for controlling the opening of the inlet chamber, and means connecting the several dampers whereby, when the first-named damper is actuated, the other dampers will be actuated.

6. Recirculating means for a heating and ventilating unit comprising a chamber adapted to contain a motor and blowers, said chamber having an opening in its top and an inlet chamber at its back, a horizontally arranged damper for controlling the opening in the top of the chamber, a plurality of duplex dampers arranged vertically in the inlet chamber for controlling the opening thereof, and means between the first-named damper and the duplex dampers whereby, when the first-named damper is actuated, the duplex dampers will be shifted relatively in opposite directions.

7. Recirculating means for a heating and ventilating unit comprising a chamber adapted to contain a motor and blowers, an opening in the top of the chamber and an inlet at the back thereof, a horizontal sliding damper for controlling the opening in the top of the chamber, and a plurality of sliding dampers in the inlet chamber adapted to be shifted relatively to each other, and means connecting the first-named damper with the other dampers whereby, when the first-named damper is operated, the other dampers will be shifted variably relatively to the first-named damper.

8. Recirculating means for a heating and ventilating unit, comprising a chamber adapted to receive a motor and blowers, said chamber having an opening in its top and an inlet chamber at its back, a horizontal sliding damper for controlling the opening in the top of the chamber, and sliding dampers in the inlet chamber for controlling the opening thereof, and lever mechanism between the several dampers whereby, when the first-named damper is actuated, the other dampers will be proportionally actuated.

9. A heating and ventilating unit having an inlet chamber, duplex dampers arranged in the chamber edgewise vertically and in parallelism, tracks at top and bottom of the chamber in which the dampers run, a filling strip extending transversely across the dampers for preventing leakage of air when the dampers are in closed position, and means for actuating said dampers.

10. A heating and ventilating unit having a motor and blower chamber provided with an opening in its top extending from side to side thereof and from the front toward the rear thereof, track strips mounted on the under side of the top of the chamber, a damper extending from side to side of the unit and adapted to cover the opening, said damper being provided at its opposite ends with anti-frictional rolls for tracking on said strips, and means whereby the damper may be shifted to control the size of the opening in the top of the chamber.

11. A heating and ventilating unit having at its top a motor and blower chamber provided with an opening in its top and an inlet chamber at its back, two dampers mounted in the inlet chamber for controlling the opening thereof supports mounted on the under side of the top of the chamber, a damper carried by said supports, bell-crank levers pivotally mounted on said supports, a link connecting the bell-crank levers, links connecting the bell-crank levers with the top damper, and a link connecting one of the bell-crank levers with one of the inlet dampers, and means connecting the latter damper with the other inlet damper whereby, when the top damper is shifted, the other dampers will be commensurately shifted so as to simultaneously control the inlet opening and the opening in the top of the chamber.

12. A heating and ventilating unit comprising a blower chamber having a top member provided with an opening to the top of said chamber for the admission of air, a grille covering said opening, a damper supported by the top member on the inside thereof parallel therewith and operating closely thereto but in a plane below said grille, said damper being co-extensive with the grille covering the opening, means whereby the damper may be shifted in right-lines under said grille to control the said opening, and means on the grille for guiding the said shifting means.

13. A heating and ventilating unit having a blower chamber at the top thereof, and a shallow inlet chamber arranged at the back of the blower chamber adapted to be inserted in an opening in the wall of the building, whereby to enable the unit to be snugly set against the wall of the building, right-line reciprocating dampers in said inlet chamber and, accessible means at the top of the unit for actuating said dampers to control the opening in the chamber.

MICHAEL J. CALLAHAN.